US012170421B2

(12) United States Patent
Liao

(10) Patent No.: US 12,170,421 B2
(45) Date of Patent: Dec. 17, 2024

(54) PLUG STORAGE SEAT AND PLUG KIT

(71) Applicant: GUANGDONG GOPOD GROUP HOLDING CO., LTD, Guangdong (CN)

(72) Inventor: Zhuowen Liao, Guangdong (CN)

( * ) Notice: Subject to any disclaimer, the term of this patent is extended or adjusted under 35 U.S.C. 154(b) by 372 days.

(21) Appl. No.: 17/773,071

(22) PCT Filed: Apr. 23, 2020

(86) PCT No.: PCT/CN2020/086484
§ 371 (c)(1),
(2) Date: Apr. 29, 2022

(87) PCT Pub. No.: WO2021/212432
PCT Pub. Date: Oct. 28, 2021

(65) Prior Publication Data
US 2022/0399675 A1 Dec. 15, 2022

(51) Int. Cl.
*H01R 13/518* (2006.01)
*H01R 31/06* (2006.01)

(52) U.S. Cl.
CPC ........... *H01R 13/518* (2013.01); *H01R 31/06* (2013.01)

(58) Field of Classification Search
CPC ....... H01R 13/518; H01R 13/60; H01R 31/06
USPC .................................................. 439/625, 528
See application file for complete search history.

(56) References Cited

U.S. PATENT DOCUMENTS

2007/0066130 A1* 3/2007 Mori ...................... H01R 43/00 439/501
2016/0111817 A1* 4/2016 Linderman ............ H01R 13/60 439/345

FOREIGN PATENT DOCUMENTS

CN 204858198 U 12/2015

OTHER PUBLICATIONS

International Search Report of PCT Patent Application No. PCT/CN2020/086484 issued on Jan. 20, 2021.

* cited by examiner

*Primary Examiner* — Gary F Paumen

(57) ABSTRACT

A plug storage base and a plug kit. The plug storage base is configured to store at least two detachable plugs. The plug storage base comprises a connecting body and at least two storage structures disposed on the connecting body, wherein each of the storage structures comprises a mounting recess provided in the connecting body; the mounting recess is arranged in a run-through manner in an extension direction thereof; the mounting recess is configured to store a plugging structure; and a recess wall of the mounting recess is provided with a first slip connection structure for slip connection with the plugging structure of the detachable plug. The plug storage base can store at least two detachable plugs, and achieve fitting and slip connection with the detachable plugs by means of the first slip connection structures, so as to prevent the loss of multiple detachable plugs when being placed separately.

10 Claims, 5 Drawing Sheets

PLUG STORAGE SEAT AND PLUG KIT

TECHNICAL FIELD

The present invention belongs to the technical field of connecting bases, and in particular relates to a plug storage base and a plug kit.

BACKGROUND ART

In order to implement plugging between a power adapter and various sockets, the power adapter needs to be provided with different types of detachable plugs for replacement. At present, there are detachable plugs that are sleeved on two-phase pins of the power adapter to achieve electrical connection with the power adapter. However, due to different types of sockets, it is often necessary to provide multiple different types of plugs, and these plugs are easy to lose when being placed separately, and are also inconvenient to carry.

SUMMARY OF THE INVENTION

An objective of the present invention is to provide a plug storage base and a plug kit, aiming to solve the technical problem in the prior art that plugs are easy to lose when being placed separately and are inconvenient to carry.

According to a first aspect, the embodiments of the present invention provide a plug storage base for storing at least two detachable plugs, each of the detachable plugs comprising a plug body and a plugging structure connected to the plug body. the plug storage base comprises a connecting body and at least two storage structures disposed on the connecting body, wherein each of the storage structures comprises a mounting recess provided in the connecting body; the mounting recess is arranged in a run-through manner in an extension direction thereof; the mounting recess is configured to store the plugging structure; and a recess wall of the mounting recess is provided with a first slip connection structure for slip connection with the plugging structure.

In one of the embodiments of the first aspect, the storage structure further comprises a stop block connected to the recess wall of the mounting recess, and the stop block is adapted to and plugged in the plugging structure in the extension direction of the mounting recess.

In one of the embodiments of the first aspect, the first slip connection structure comprises a slip connection slot provided in the recess wall of the mounting recess, and the slip connection slot extends in the extension direction of the mounting recess.

In one of the embodiments of the first aspect, the plug storage base further comprises a first engaging structure for engaging with the plug body.

In one of the embodiments of the first aspect, the first engaging structure is an engaging slot provided in the side of the stop block that faces away from the bottom of the mounting recess.

In one of the embodiments of the first aspect, the connecting body has a first connecting surface, a second connecting surface and a third connecting surface, wherein the second connecting surface faces away from the third connecting surface, the first connecting surface is connected to the second connecting surface and the third connecting surface, one of the storage structures further comprises an accommodating recess provided in the first connecting surface and configured to accommodate the plug body, and the mounting recess is provided in the recess wall of the accommodating recess and runs through to the first connecting surface.

In one of the embodiments of the first aspect, the accommodating recess runs through to the second connecting surface.

In one of the embodiments of the first aspect, the mounting recess is provided in a side wall of the accommodating recess that faces the second connecting surface.

In one of the embodiments of the first aspect, the mounting recess is provided in a side wall of the accommodating recess that is perpendicular to a connecting line between the second connecting surface and the third connecting surface.

In one of the embodiments of the first aspect, the accommodating recess runs through the second connecting surface and the third connecting surface.

In one of the embodiments of the first aspect, one of the storage structures further comprises an avoidance groove communicating with the accommodating recess.

According to a second aspect, the embodiments of the present invention provides a plug kit, comprising detachable plugs and a plug storage base described above, each of the detachable plugs comprising a plug body, a plugging structure connected to the plug body, and a second slip connection structure connected to the plugging structure, wherein the second slip connection structure is capable of being in slip connection with the first slip connection structure when the plugging structure is received in the mounting recess.

In one of the embodiments of the second aspect, the second slip connection structure is a sliding block disposed on the plugging structure.

In one of the embodiments of the second aspect, each of the detachable plugs further comprises a second engaging structure of the plug body, and the second engaging structure is capable of being clamped with the first engaging structure when the plugging structure is received in the mounting recess.

In one of the embodiments of the second aspect, the second engaging structure is a bump protruding from the plug body.

Compared with the prior art, the present invention has the following technical effects: according to the present invention, at least two storage structures are provided to provide mounting locations for at least two detachable plugs, the plugging structure of each of the detachable plugs can be stored in the mounting recess of one storage structure, the recess wall of the mounting recess is provided with the first slip connection structure, and the plugging structure can slide into the mounting recess by means of the first slip connection structure so as to achieve the function of guiding the plugging structure and implement connection to the plug storage base. The first slip connection structure is disposed on the recess wall of the mounting recess and thus may have a function of stopping the detachable plugin the direction perpendicular to the extension direction of the mounting recess, so as to prevent the detachable plug from being separated from the plug storage base in the direction perpendicular to the extension direction of the first slip connection structure, so that the plug storage base can store at least two detachable plugs and is convenient to carry, so as to prevent the occurrence of easy losing of multiple detachable plugs when being placed separately.

BRIEF DESCRIPTION OF THE DRAWINGS

In order to explain the technical solutions of the embodiments of the present invention more clearly, the drawings needed in the description of the embodiments of the present invention or the prior art will be briefly introduced below. Obviously, the drawings described below are only some embodiments of the present invention, and for those of ordinary skill in the art, other drawings can be obtained based on these drawings without involving any inventive effort.

REFERENCE NUMERALS

Figure 1:
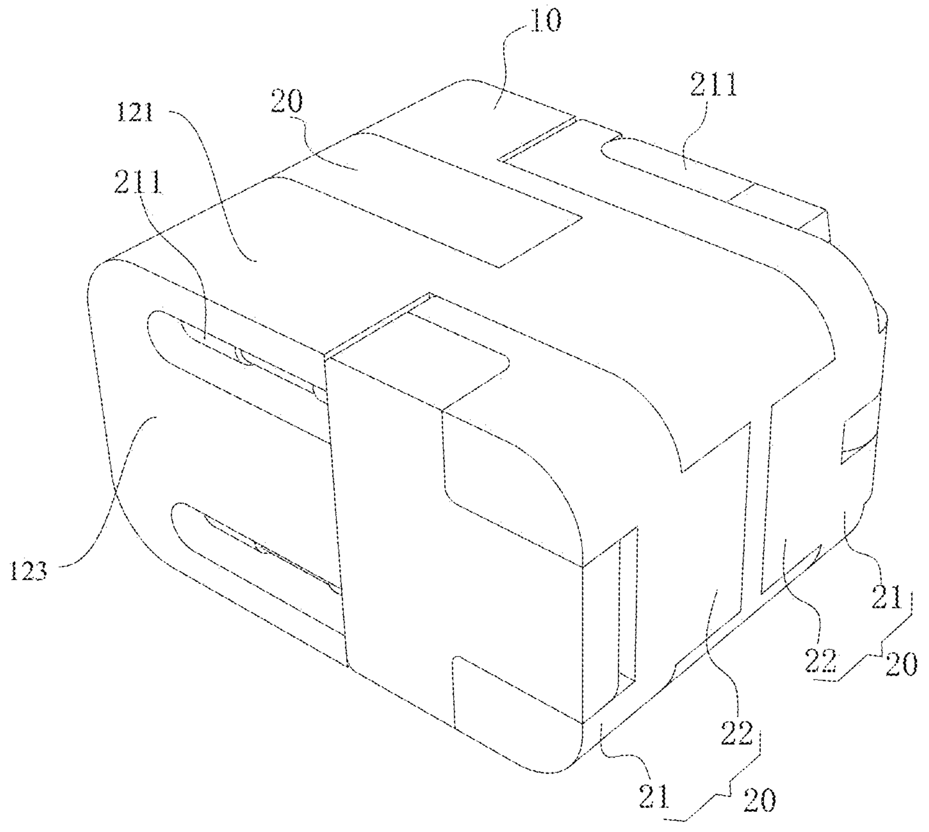
FIG. 1 is a structural perspective view of a plug kit provided in an embodiment of the present invention from a perspective.

10. plug storage base; 101. through hole; 11. storage structure; 111. accommodating recess; 112. mounting recess; 113. stop block; 114. first slip connection structure; 115. first engaging structure; 116. avoidance groove; 117. recess wall; 12. connecting body; 121. first connecting surface; 122. second connecting surface; 123. third connecting surface; 20. detachable plug; 21. plug body; 211. pin; 22. plugging structure; 221. fastener; 23. second slip connection structure; and 24. second engaging structure.

DETAILED DESCRIPTION OF EMBODIMENTS

The embodiments of the present invention will be described below in detail, and examples of the embodiments are shown in the drawings, and throughout the drawings, the same or similar reference numerals represent the same or similar elements or elements having the same or similar functions. The embodiments described below with reference to the accompanying drawings are exemplary and are intended to be illustrative of the present invention, but should not be interpreted as limiting the present invention.

In the description of the present invention, it should be understood that the orientations or positional relationships indicated by the terms such as "length", "width", "top", "bottom", "inner" and "outer" are based on the orientations or positional relationships shown in the drawings, and are only to facilitate the description of the present invention and simplify the description, rather than indicating or implying that the device or element referred to must have a particular orientation or be constructed and operated in a particular orientation, and therefore should not be construed as limiting the present invention.

In addition, the terms "first", "second" and "third" are used for descriptive purposes only, and should not be construed as indicating or implying relative importance or implicitly indicating the number of technical features indicated. Therefore, the features defined with "first", "second" and "third" can explicitly or implicitly include one or more of the features. In the description of the present invention, the word "multiple" means two or more, unless otherwise explicitly and specifically defined.

In the present invention, the terms such as "mounting", "connecting", "connection" and "fixing" should be understood in a broad sense, for example, may be a fixed connection or a detachable connection or be integrated, may be a mechanical connection or an electrical connection, may be a direct connection, or may be an indirect connection via an intermediate medium, or may be internal communication between two elements or an interaction relationship between two elements, unless otherwise explicitly specified and limited. For those of ordinary skill in the art, the specific meaning of the terms mentioned above in the present invention should be understood according to specific circumstances.

In order to make the objective, technical solutions and advantages of the present invention clearer, the present invention will be described in further detail below with reference to the drawings and embodiments.

Figure 2:
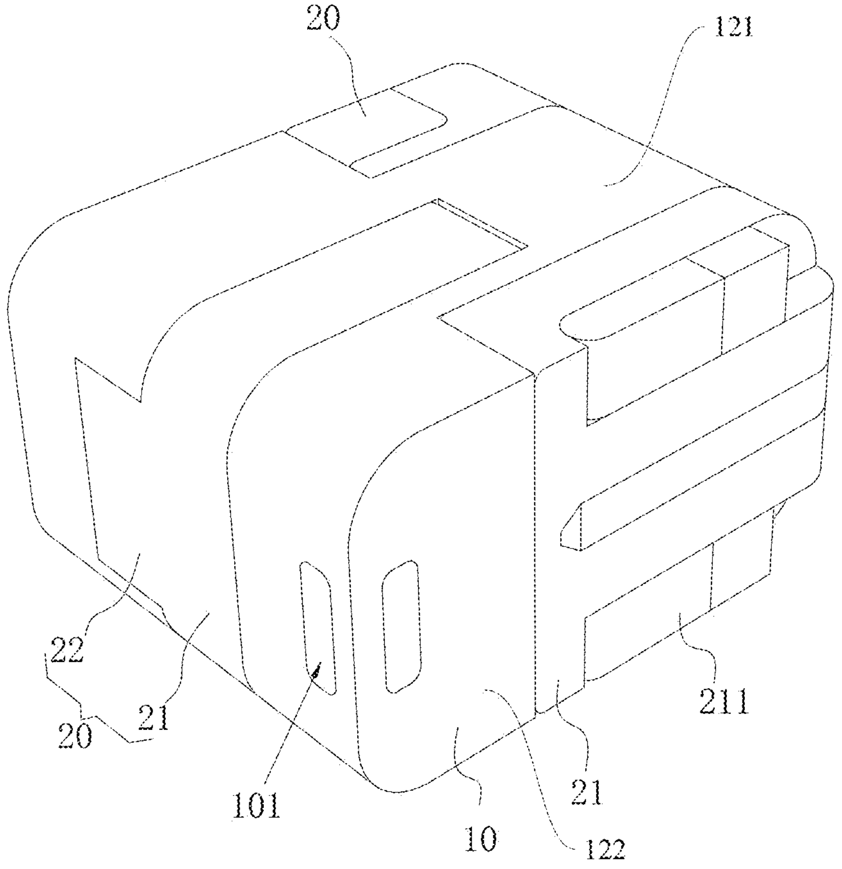
FIG. 2 is a structural perspective view of a plug kit provided in an embodiment of the present invention from another perspective.
Figure 3:
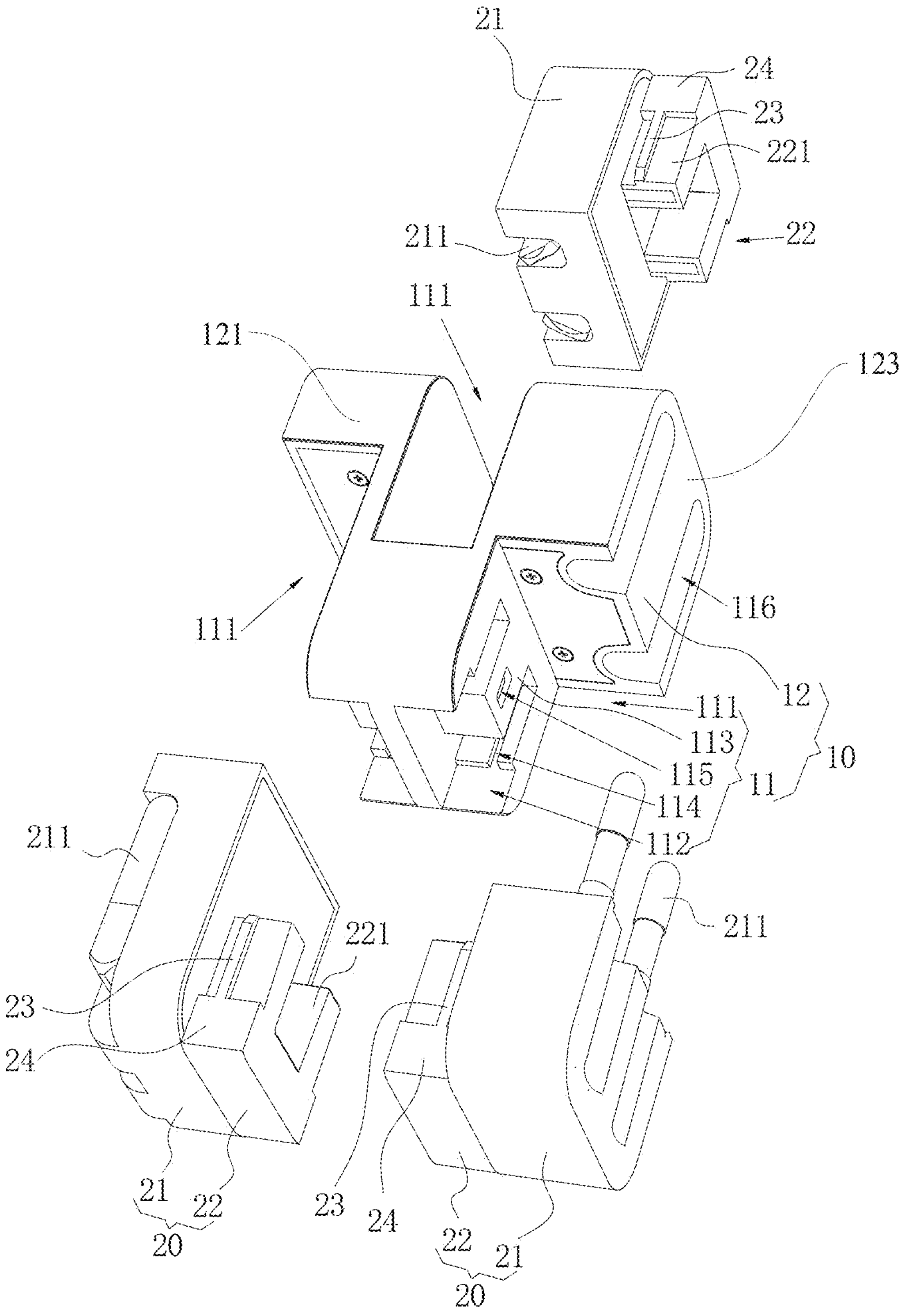
FIG. 3 is an exploded view of a plug kit provided in an embodiment of the present invention, with pins of detachable plugs being collapsed.

Referring to FIGS. 1 to 3, the present invention provides a plug storage base 10 for storing at least two detachable plugs 20, wherein each detachable plug 20 comprises a plug body 21 and a plugging structure 22, and the plugging structure 22 comprises two fasteners 221. In some embodiments, a connecting block connected to the plug body 21 may be provided between the two fasteners 221, a plugging body is provided with two or three pins 211, and the pins 211 are rotatably connected to the plug body 21 and can be collapsed or splayed.

Referring to FIG. 3, the plug storage base 10 comprises a connecting body 12 and at least two storage structures 11 disposed on the connecting body 12. Each storage structure 11 comprises a mounting recess 112 provided in the connecting body 12 and a stop block 113 connected to a recess wall 117 of the mounting recess 112, the mounting recess 112 is arranged in a run-through manner in an extension direction thereof, the mounting recess 112 is configured to store the plugging structure 22, and the stop block 113 can be adapted to and plugged in the plugging structure 22. Preferably, the stop block 113 can divide the mounting recess 112 into two separate slots each adapted to one of the fasteners 221, and the connecting block is adapted to and plugged in the stop block 113. In this embodiment, three storage structures 11 are provided to store three detachable plugs 20. Preferably, the multiple mounting recesses 112 are spaced apart from each other so as to prevent the multiple detachable plugs 20 from interfering with each other during installation.

Figure 4:
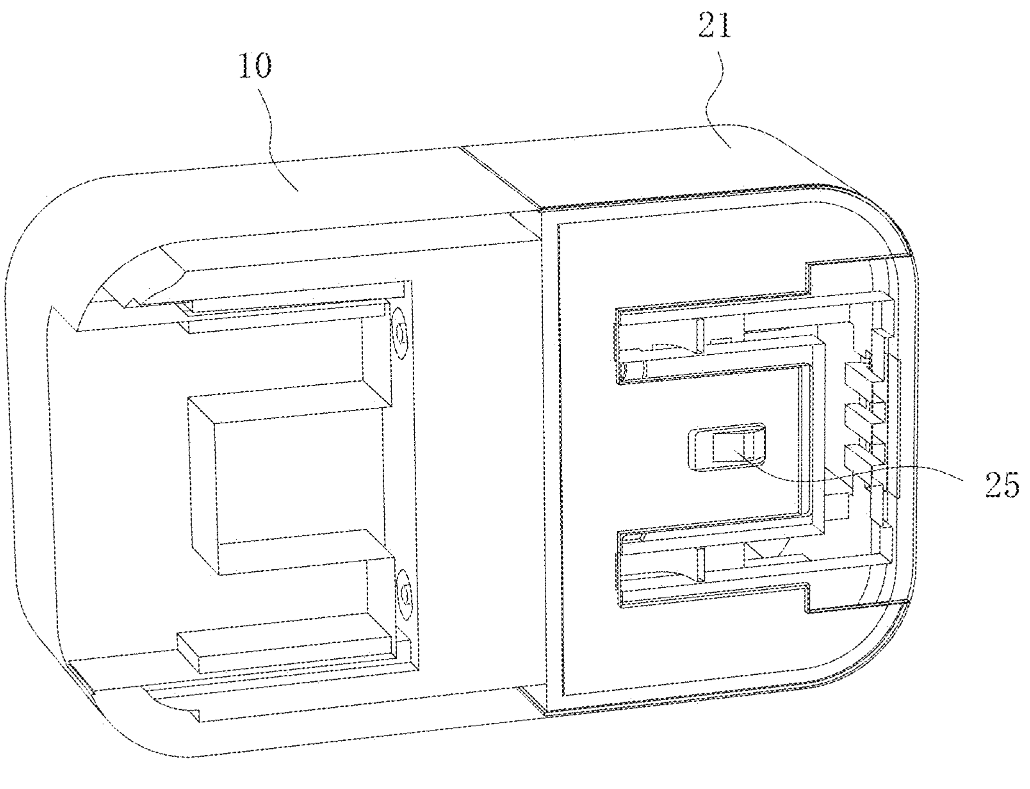
FIG. 4 is across-sectional view of across section of a plug kit provided in an embodiment of the present invention.
Figure 5:
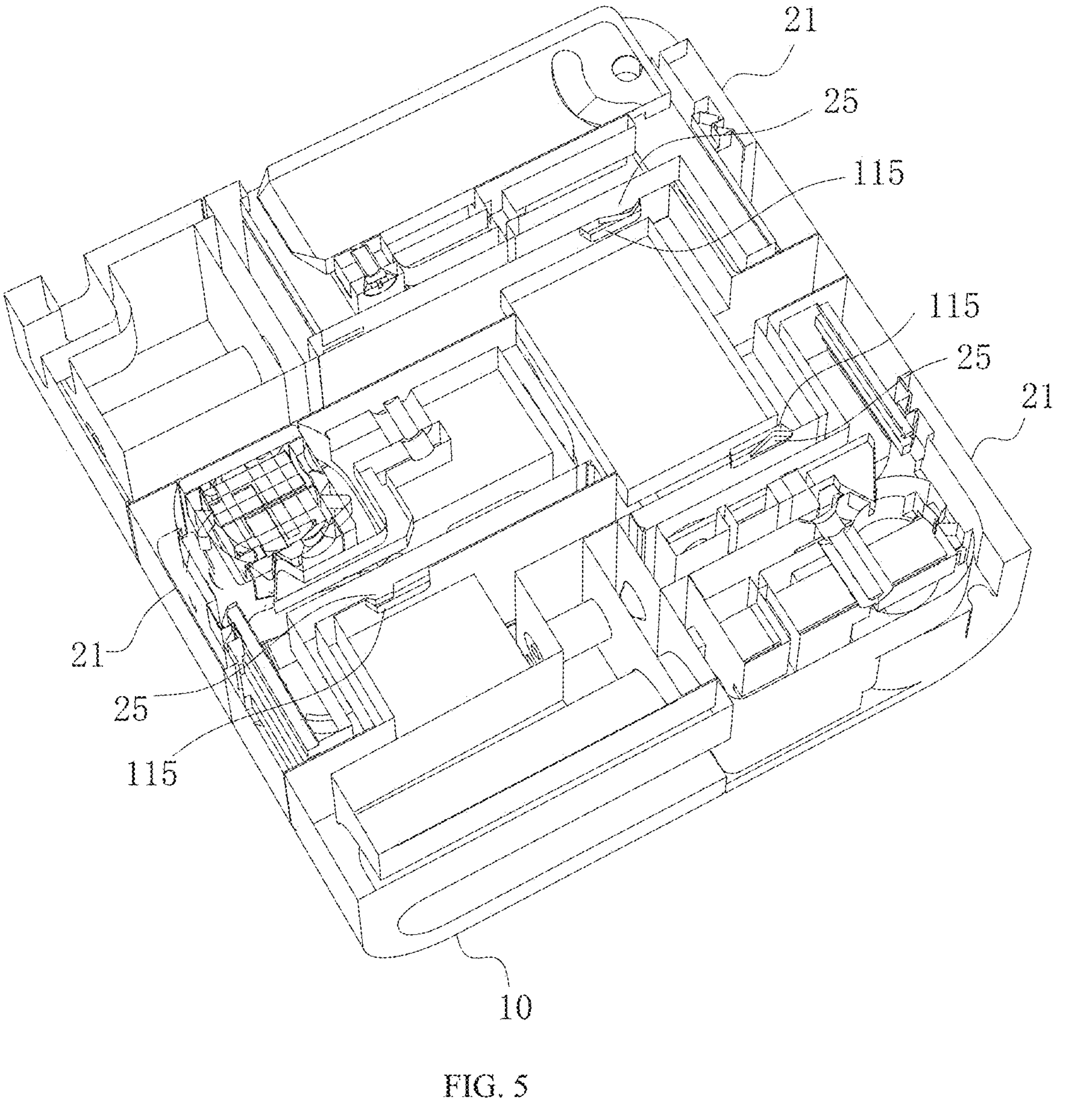
FIG. 5 is across-sectional view of another cross section of a plug kit provided in an embodiment of the present invention.

An inner wall surface of the mounting recess 112 has a bottom surface, a slot back surface that is opened in an extension direction of the mounting recess, and two slot side surfaces located on two sides of the opening in the extension direction of the mounting recess. Referring to FIGS. 4 and 5, in order to achieve alignment of the pluggable plug and the mounting recess 112, the recess wall 117 of the mounting recess 112 is provided with a first slip connection structure 114 for slip connection with the plugging structure 22. Accordingly, this plug storage base 10 is suitable for detachable plugs 20 each provided with a second slip connection structure 23 that is adapted and in slip connection with the first slip connection structure 114. One first slip connection structure 114 may be provided and is arranged on a slot side surface of the mounting recess 112 and extends in an extension direction of the mounting recess 112, or two first slip connection structures 114 maybe provided and are respectively arranged on both slot side surfaces of the mounting recess 112 so as to have a function of stopping the plugging structure 22 on both sides. Optionally, the first slip connection structure 114 maybe a sliding block, and the second slip connection structure 23 is a slip connection slot. In this embodiment, the first slip connection structure 114 is a slip connection slot, and the second slip connection structure 23 is a sliding block. This can avoid affecting the structural stability of a socket. The slip connection slot may be adapted to the sliding block, and the slip connection slot may have a width greater than that of the sliding block, as long as a side surface of the slip connection slot facing the bottom of the mounting recess 112 can fit to the sliding block when the connecting block is plugged with the stop block 113.

According to the present invention, at least two storage structures 11 are provided to provide mounting locations for at least two detachable plugs 20, the plugging structure 22 of each of the detachable plugs 20 can be stored in the mounting recess 112 of one storage structure 11, the recess wall 117 of the mounting recess 112 is provided with the first slip connection structure 114, and the plugging structure 22 can slide into the mounting recess 112 by means of the first slip connection structure 114 so as to achieve the function of guiding the plugging structure 22 and implement connection to the plug storage base 10. The first slip connection structure 114 is disposed on the recess wall 117 of the mounting recess 112 and thus can stop the detachable plugs 20 in the direction perpendicular to the extension direction of the mounting recess, so as to prevent the detachable plugs 20 from being separated from the plug storage base 10 in the direction perpendicular to the extension direction of the first slip connection structure 114, so that the plug storage base 10 can store at least two detachable plugs 20 and is convenient to carry, so as to prevent the occurrence of easy losing of multiple detachable plugs 20 when being placed separately.

Referring to FIGS. 4 and 5, in order to prevent the detachable plugs 20 from accidentally slipping out of the mounting recesses 112, the plug storage base 10 further comprises a first engaging structure 115 for clamped with the plug body 21. Accordingly, the plug storage base 10 is suitable for detachable plugs 20 each provided with a second engaging structure 24 that is adapted and clamped with the first engaging structure 115. In this way, the detachable plug 20 can only be detached from the mounting recess 112 by an external force, so as to prevent the detachable plug 20 from being lost. Optionally, the first engaging structure 115 may be a bump, and the second engaging structure 24 may be an engaging slot adapted to the bump. In this embodiment, the first engaging structure 115 is an engaging slot, and the second engaging structure 24 is a bump. The engaging slot is provided in the side of the stop block 113 that faces away from the bottom of the mounting recess 112 so as to achieve engaging and fitting with the plug body 21. In other embodiments, the plug storage base without the first engaging structure 115 may also be suitable for a detachable plug 20 each provided with a bump. In this case, the slip connection and fitting between the first slip connection structure 114 and the second slip connection structure 23 is implemented by the stop block 113 or/and the plug body 21 through elastic deformation, and the bump and the stop block 113 elastically abut together through a friction force under the action of an external force, so as to implement fastening and connection between the detachable plugs 20 and the plug storage base 10.

The connecting body 12 has a first connecting surface 121, a second connecting surface 122 and a third connecting surface 123. The second connecting surface 122 faces away from the third connecting surface 123, the first connecting surface 121 is connected to the second connecting surface 122 and the third connecting surface 123, and referring to FIG. 3, one of the storage structures 11 further comprises an accommodating recess 111 provided in the first connecting surface 121 and configured to store the plug body 21, and the mounting recess 112 is provided in the recess wall 117 of the accommodating recess 111 and runs through to the first connecting surface 121. The accommodating recess 111 can be adapted to the plug body 21 when the plugging structure 22 is in plugged with the stop block 113 so as to prevent the plug body 21 from shaking when being bumped and thus prevent loosened connection between the plugging structure 22 and the stop block 113 caused by the shaking of the plug body 21. A side wall of the accommodating recess 111 is closed to protect the detachable plugs 20 from being bumped. In addition, the pins 211 of the plug body 21 can be stored in the accommodating recess 111.

Referring to FIG. 3, preferably, the accommodating recess 111 runs through to the second connecting surface 122. In this way, in one direction, the detachable plug 20 can be mounted to the accommodating recess 111, and in the other direction, the detachable plug 20 is taken out from the accommodating recess 111.

Referring to FIG. 3, the mounting recess 112 may be provided in a side wall of the accommodating recess 111 that faces the second connecting surface 122. In this way, each detachable plug 20 can be plugged into the accommodating recess 111 in the direction of the first connecting surface 121, so that the plugging structure 22 of the detachable plug is inserted into the stop block 113 and accommodated in the mounting recess 112. A user moves the plug body 21 from the opening of the accommodating recess 111 in the second connecting surface 122.

Optionally, the mounting recess 112 is provided in a side wall of the accommodating recess 111 perpendicular to a connecting line between the second connecting surface 122 and the third connecting surface 123. In this way, the user performs the moving operation from a side of the plug body 21.

Referring to FIG. 3, preferably, the accommodating recess 111 runs through the second connecting surface 122 and the third connecting surface 123. In this way, the storage structure 11 avoids the opposite sides of the plug body 21, so that the user can hold the plug body 21 from two side surfaces of the plug body 21.

Referring to FIGS. 1 and 2, pins 211 of the detachable plugs 20 are preferably collapsible so as to reduce the space occupied thereby, and referring to FIG. 3, the plug storage base 10 is adapted to the detachable plugs, and one of the storage structures 11 further comprises an avoidance groove 116 communicating with the accommodating recess 111. Since there are usually two pins 211 of the detachable plug 20, two avoidance grooves 116 maybe provided, and the two avoidance grooves 116 are arranged in parallel and spaced apart to respectively receive the pins 211.

There are many ways of fixing the stop block 113 in the mounting recess 112. Preferably, the stop block 113 extends in the same direction as the extension direction of the mounting recess 112 so as to facilitate machining.

Referring to FIG. 3, since a connecting block is provided between two fasteners 221, in order to implement plugging to the connecting block, the stop block 113 is provided with a limiting slot in an end face of the stop block in an extension direction thereof, and the connecting block can be inserted in the limiting slot to prevent the detachable plug 20 from being loosened from the side.

Since the connecting block is usually connected to a side wall of the plugging body, with the protruding direction thereof being perpendicular to the extension direction, in order to adapt to the plugging structure 22, the limiting slot is arranged in a run-through manner in the opening direction of the mounting recess 112, so that the connecting block can be plugged in the limiting slot of the stop block 113 when the plugging structure 22 slides in from the opening of the mounting recess 112 in the extension direction.

The limiting slot sequentially comprises a limiting section and a connecting section in the extension direction of the limiting slot, and the slot width of the connecting section is smaller than that of the limiting section, so as to adapt to the structure of the connecting block. In this way, the connecting section achieves the function of limiting the connecting block in the opening direction of the mounting recess 112, thereby preventing the connecting block from being separated from the limiting section.

In order to implement the tight connection between the storage structure 11 and the detachable plug 20, the limiting slot is in an interference-fit with the plugging structure 22, and since the fastener 221 of the plugging structure 22 is of a hollow structure, certain elastic deformation can be generated so as to achieve abutting with the storage structure 11 under the action of friction force.

Referring to FIG. 2, in order to facilitate the carrying of the plug storage base 10, the plug storage base 10 is further provided with a through hole 101 arranged in a run-through manner, and the user can pass a string through the through hole 101 to fix the plug storage base 10 to other parts for easy access and carrying.

Referring to FIGS. 1 and 2, the present invention further provides a plug kit, comprising detachable plugs 20 and a plug storage base 10 provided by the foregoing embodiments. The plug storage base 10 has the same structural features and functions as the plug storage base 10 in the foregoing embodiments, and will not be repeated here.

Referring to FIG. 3, each detachable plug 20 comprises a plug body 21, a plugging structure 22, a second slip connection structure, and a second engaging structure. The plugging structure 22 of the detachable plug 20 comprises two fasteners 221 and a connecting block located between the two fasteners 221. A plugging body is provided with two or three pins 211, and the pins 211 are rotatably connected to the plug body 21 and can be collapsed or splayed. The plugging body 21 is provided with two or three pins 211, and the pins 211 are rotatably connected to the plug body 21 and can be collapsed or splayed. The pins 1, 2 maybe pins conforming to British standards, European standards or American standards.

Referring to FIGS. 3 to 5, the second slip connection structure 23 is disposed on the side of one of the fasteners 221 that faces away from the other fastener 221 so as to implement the slip connection and fitting with the first slip connection structure 114. Preferably, two second slip connection structures 23 may be provided, and the two second slip connection structures 23 are respectively disposed on the two sides of the two fasteners 221 that face away from each other. When the first slip connection structure 114 is a slip connection slot, the second slip connection structure 23 is a sliding block, and the sliding block is elongated and extends in the extension direction of the mounting recess 112, so as to implement quick and stable connection with the slip connection slot. Preferably, the sliding block has a beveled surface for guiding, so as to implement quick docking with the slip connection slot. A portion of the sliding block that faces away from the beveled surface is provided with a stop protrusion to limit the fitting length of the detachable plug 20 and the plug storage base 10.

Referring to FIGS. 3 to 5, the second engaging structure 24 can be clamped with the first engaging structure 115 when the plugging structure 22 is received in the mounting recess 112, so as to prevent the detachable plugs 20 from being accidentally separated from the plug storage base 10 and further prevent the detachable plugs 20 from being lost. The second engaging structure 24 is disposed on the plug body 21 and located between the two fasteners 221 and preferably on the connecting block, so as to achieve engaging and fitting with the first engaging structure 115 on the stop block 113. When the first engaging structure 115 is an engaging slot, the second engaging structure 24 is a bump which is adapted to the engaging slot. This has a function of limiting the plug body 21, so that the detachable plugs 20 can be separated from the plug storage base 10 only when the bump moves out of the engaging slot under the action of an external force. One first engaging structure 115 and one second engaging structure 24 may be provided, or multiple first engaging structures and multiple second engaging structures maybe provided, which is not limited herein.

The above are merely preferred embodiments of the present invention, only the technical principles of the present invention are specifically described, and these descriptions are only for explaining the principles of the present invention and should not be interpreted in anyway as limiting the scope of protection of the present invention. Based on the explanation herein, any modifications, equivalent replacements, and improvements made within the spirit and principles of the present invention, and other specific implementations of the present invention conceived by those skilled in the art without involving any inventive effort should fall within the scope of protection of the present invention.

The invention claimed is:

1. A plug storage base for storing at least two detachable plugs, each of the detachable plugs comprising a plug body and a plugging structure connected to the plug body, the plug storage base comprising a connecting body and at least two storage structures disposed on the connecting body, wherein each of the storage structures comprises a mounting recess provided in the connecting body; the mounting recess is arranged in a run through manner in an extension direction thereof; the mounting recess is configured to store the plugging structure; and a recess wall of the mounting recess is provided with a first slip connection structure for slip connection with the plugging structure;

wherein the connecting body has a first connecting surface, a second connecting surface and a third connecting surface, the second connecting surface facing away from the third connecting surface, the first connecting surface being connected to the second connecting surface and the third connecting surface, one of the storage structures further comprising an accommodating recess that is provided in the first connecting surface and configured to accommodate the plug body, and the mounting recess being provided in the recess wall of the accommodating recess and running through to the first connecting surface.

2. The plug storage base of claim 1, wherein each storage structure further comprises a stop block connected to the recess wall of the mounting recess.

3. The plug storage base of claim 2, wherein the first slip connection structure is a slip connection slot provided in the recess wall of the mounting recess, and the slip connection slot extends in the extension direction of the mounting recess.

4. The plug storage base of claim 2, wherein the plug storage base further comprises a first engaging structure for engaging with the plug body.

5. The plug storage base of claim 4, wherein the first engaging structure is an engaging slot provided in the side of the stop block that faces away from the bottom of the mounting recess.

6. The plug storage base of claim 1, wherein one of the storage structures further comprises an avoidance groove communicating with the accommodating recess.

7. A plug kit, comprising detachable plugs and a plug storage base of claim 1, each of the detachable plugs comprising a plug body, a plugging structure connected to the plug body, and a second slip connection structure connected to the plugging structure, wherein the second slip connection structure is capable of being in slip connection with the first slip connection structure when the plugging structure is received in the mounting recess.

8. The plug kit of claim 7, wherein the second slip connection structure is a sliding block disposed on the plugging structure.

9. The plug kit of claim 7, wherein each of the detachable plugs further comprises a second engaging structure connected to the plug body, and the second engaging structure is capable of being engaged with the first engaging structure when the plugging structure is received in the mounting recess.

10. The plug kit of claim 9, wherein the second engaging structure is a bump protruding from the plug body.

* * * * *